United States Patent [19]

Bradley et al.

[11] 4,443,847

[45] Apr. 17, 1984

[54] PAGE ADDRESSING MECHANISM

[75] Inventors: David J. Bradley; Lewis C. Eggebrecht, both of Boca Raton; Dennis S. Gibbs, Lighthouse Point; Donald J. Kostuch, Boca Raton, all of Fla.

[73] Assignee: International Business Machines Corporation, Armonk, N.Y.

[21] Appl. No.: 231,653

[22] Filed: Feb. 5, 1981

[51] Int. Cl.³ ............................................. G06F 9/30
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,068,300 | 1/1978 | Bachman | 364/200 |
| 4,158,227 | 6/1979 | Baxter et al. | 364/200 |
| 4,218,741 | 8/1980 | Dixon et al. | 364/200 |

*Primary Examiner*—Thomas M. Heckler
*Attorney, Agent, or Firm*—Harry W. Barron

[57] ABSTRACT

In a computer system, paging operates and a method of use thereof are provided for extending the addressing capability of a processor by using a page register. The page register includes means for storing different codes for different operations to be performed on the memory. The memory is divided into four groups of memory within $2^n$ addresses such that there is paged and unpaged ROM and pages and unpaged RAM. The unpaged ROM and RAM include only a single block which is directly addressed by the n bit address bus. The paged ROM and RAM includes a plurality of blocks or pages, one of which is selected to be addressed by the page register. The page register responds to the address bus and to signals from the processor defining the memory operation to be performed by providing page signals, selecting one page of paged memory. The method of using the paging apparatus includes creating a table in the unpaged RAM of all routines in the paged memory blocks and using the table to transfer from one routine to another. Within the table is a code identifying the page in which the new routine exists and an offset into that page used to determine the address in that page of the new routine.

13 Claims, 10 Drawing Figures

| FIG. 3A |
| FIG. 3B |

PAGE ADDRESSING MECHANISM

This invention relates to memory addressing and, more particularly, to apparatus and the method for accessing an amount of memory greater than can be normally accessed using a given size address bus.

It is well known from the prior art that one can increase the size of memory addressed by an address bus carrying N bits of information from the normal 2loca-tions to some multiple of $2^N$ by utilizing the technique of paging. This technique generally is implemented by providing a large memory having pages broken into $2^N$ addressable segments and further providing an external register which can be set by a processing unit to provide a given code selecting one of the various pages. An example of such a system is shown in U.S. Pat. No. 4,037,211 to Ikuta et al, granted July 19, 1977.

In the prior art, a single register is provided to enable one of the several pages of the memory. Each time a memory operation on a new page is to occur, it is necessary to reset the single register. For instance, if it is desired to read information from one page of the memory and store it into a different page of the memory, the page register will have to be set before each read and before each write. Thus, what normally would be a simple sequence of read from one location and write to another location requiring two instructions would require four instructions. specifically, it would be necessary to set the page register, read the information, set the page register and write the information. The prior art paging technique becomes more cumbersome in those systems organized such that one or more pages of the memory are dedicated to storing program instructions, such as in read only memory, and other pages of the memory are dedicated to being used as general purpose random access memory. In this case, it would be necessary to set the page register first to obtain the instruction, then set it a second time to read information from the random access memory and then set the page register a third time to write information into a different portion of the random access memory.

In accordance with one preferred embodiment of this invention, there is provided an improvement in a computer system having memory means divided into addressable pages and a processing unit which provides control signals manifesting a type of memory operation to be performed. In addition, the computer system, includes addressing means for addressing the memory means, where the addressing means includes an address bus capable of addressing the pages of the memory means and where the computer system further includes page means for providing page signals which select one page of the memory means to be addressed by the address bus. The improvement is in the page means and comprises a plurality of register means each of which is separately programmable by the processing unit to store data capable of being selectably provided as said page signals. Further, each of the register means is associated with one type of memory operation. In addition, the improvement comprises decoding means responsive to the control signals for selecting one of the register means to be enabled to provide the page signals. The selected register means is that one associated with the then occurring memory operation as manifested by the then occurring control signals.

By utilizing the apparatus defined above, one can, for instance, provide separate register means for instruction fetch, memory read and memory write memory operations. By storing data in each of these three registers one time, the computer can fetch the program instruction from one page of memory and then in accordance with the instruction, read information from a second page of memory and write it into a third page of memory without the necessity of changing the code stored in a page register between each operation. This significantly enhances the performance of the processing unit.

One preferred embodiment of this invention is hereinafter described with reference being made to the following drawings in which.

Figure 1:
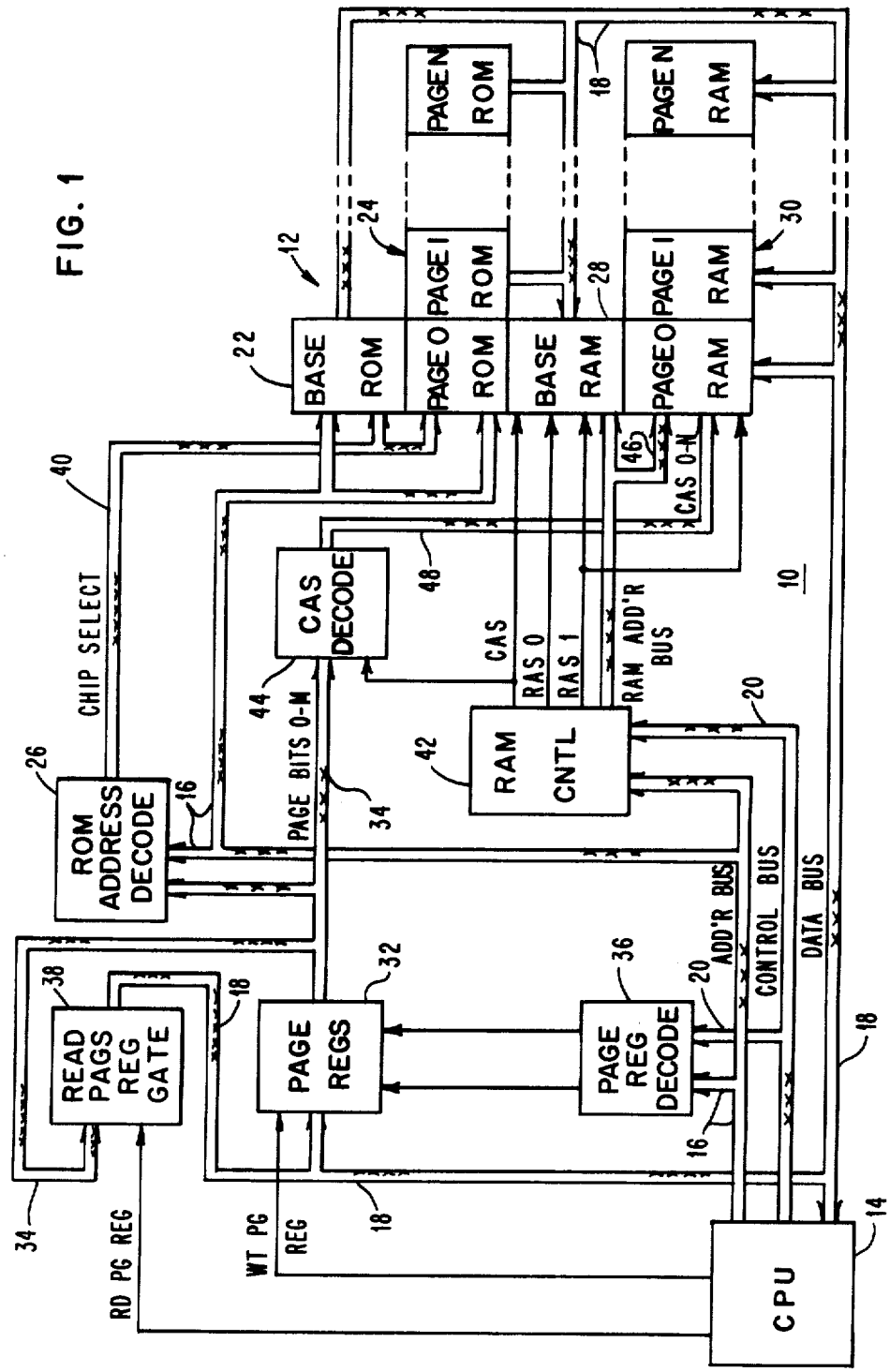
FIG. 1 is a block diagram showing the addressing apparatus for addressing a page memory.

Referring now to FIG. 1, paging apparatus 10 is shown and is used for addressing a paged memory 12 in response to signals provided from a central processing unit (CPU) 14. CPU 14 may consist of an Intel 8085 Microprocessor manufactured and sold by Intel Corp. of Santa Clara, California, together with other circuits normally associated with an 8085 microprocessor such as an 8257 direct memory access (DMA) controller. CPU 14 provides signals over an address bus 16, a data bus 18 and a control bus 20.

The address bus 16 contains sixteen lines, whereby CPU 14 can directly address 65,536 (64K) locations of memory. As described herein, each location will be considered to be the equivalent of eight binary digits (bits) or, one byte, of information. Data bus 18 consists of eight lines used for csrrying eight bits, or one byte, of information between CPU 14 and memory 12, as well as between CPU 14 and other portions of addressing apparatus 10 requiring data to be provided hereto or which provides data to be sent to CPU 14. Control bus 20 consists of a plurality of lines which signify different operations which are to be performed by CPU 14. For instance, if memory 12 is to be read, one set of signals will appear on control bus 20, whereas if the information on data bus 18 is to be written into memory 12, a different set of signals will appear on control bus 20. The detailed description of the various signals appearing on control bus 20 will be described hereafter when a more specific description of CPU 14 is given in FIG. 2.

Memory 12 consists of read only memory (ROM) and random access memory RAM), each addressable within the 64K addressing space of address bus 16. The first 32K address space is used for read only memory in which the various program modules are stored. The read only memory is further broken down into unpaged, or base, ROM 22 contained within the first 16K address locations and paged ROM 24 contained within the address locations between 16K and 32K. The paged ROM 24 is divided into zero through N pages of 16K bytes each. At any given time only one of the zero through N pages will be enabled by chip select signals applied thereto from ROM address decode circuit 26.

The random access memory is organized similar to the read only memory in that unpaged base RAM 28 exists from the address locations from 32K to 48K and zero through N pages of paged RAM 30 exists from locations 48K through 64K. With regard to the paged RAM 30, at any given time only one of the pages may be selected. This selected page will respond to address signals on address bus 16 from 48K through 64K. It should be noted that any address signal between 32K and 48K will automatically address base RAM 28.

The particular one of the pages selected from paged ROM 24 or paged RAM 30 is determined by the signal at the output of page registers 32. This signal, referred to as Page Bits 0 through M is provided from one of a plurality of selected page registers within page registers 32 over page bits bus 34. The number of page bits, M+1, provided from page register 32 will determine the number of possible pages of each of paged ROM 24 and paged RAM 30. For instance, if M is equal to seven, whereby eight page bits are provided, then the number of pages will be 256 or, if M is equal to three, whereby four page bits are provided, the number of the pages of paged ROM 24 or paged RAM 30 will be sixteen. For the embodiment described herein in FIGS. 2-4, M is selected to be three.

Page registers 32 may consist of a plurality of registers, each of which is assigned to a different function to be performed by CPU 14. For instance, if an operation fetch function is performed by CPU 14, whereby a program instruction is read from paged ROM 24, one of the registers is page registers 32 will be enabled to provide the page bits on bus 34. Separate registers within page registers 32 are also provided for the operations of reading from the paged RAM 30, writing into the paged RAM 30 and DMA operations in which the DMA is utilized to read or write from paged RAM 30. Of course, page registers 32 may include additional registers for other functions desired to be performed by CPU 14.

Page registers 32 respond to signals provided thereto from data bus 18 and to a write page register signal (WT PG REG) provided by CPU 14. In addition, register selection signals are provided to select one of the plurality of registers within page registers 32 from page register decode circuit 36. The selection signals from page register decode 36 will select one of the registers within page registers 32 to provide data on to page bits bus 34. If the WT PG REG signal from CPU is active, the data appearing on data bus 18 will be written into the selected register in page registers 32.

CPU 14 can also read the signals provided by page registers 32 by the provision of the read page register signal (RD PG REG) to enable the read page register gate 38. Read page register gate 38 responds to the page bit signals on page bit bus 34 and provides these signals back to data bus 18 when the gates therein are enabled by the RD PG REG signal from CPU 14.

The selection of either the base ROM 22 or one page of the paged ROM 24 is controlled by the ROM address decode circuit 26. ROM address decode 26 responds to signals on address bus 16 and the page bits on page bit bus 34 to provide on active chip select signals on chip select bus 40 to enable at least a portion of one of either the base ROM 22 or one page of paged ROM 24 to respond to the address signals on address bus 16. The exact operation of this will be explained in more detail with respect to FIG. 3.

The selection between base RAM 28 and paged RAM 30 is controlled by RAM controller 42 and column address strobe (CAS) decode 44. RAM controller 42 responds to the signals on address bus 16 and control bus 20 and provides a CAS signal, two row address strobe (RAS) signals, RAS0 and RAS1, and seven RAM address signals (RAM A0-A6) over RAM address bus 46. The CAS signal and the page signals on page bit bus 34 are applied to CAS decode 44 which provides the CAS0 through N signals over CAS bus 48.

The CAS, RAS0, RAS1 and the RAM address bus 46 signals are applied to base RAM 28 and the RAS1, the CAS bus 48 and the RAM address bus 46 signals are applied to the paged RAM 30 to select at least a portion of one of the RAM pages and address one location within that page. The details of the addressing scheme of the RAM is described in more detail in FIG. 4.

Figure 2:
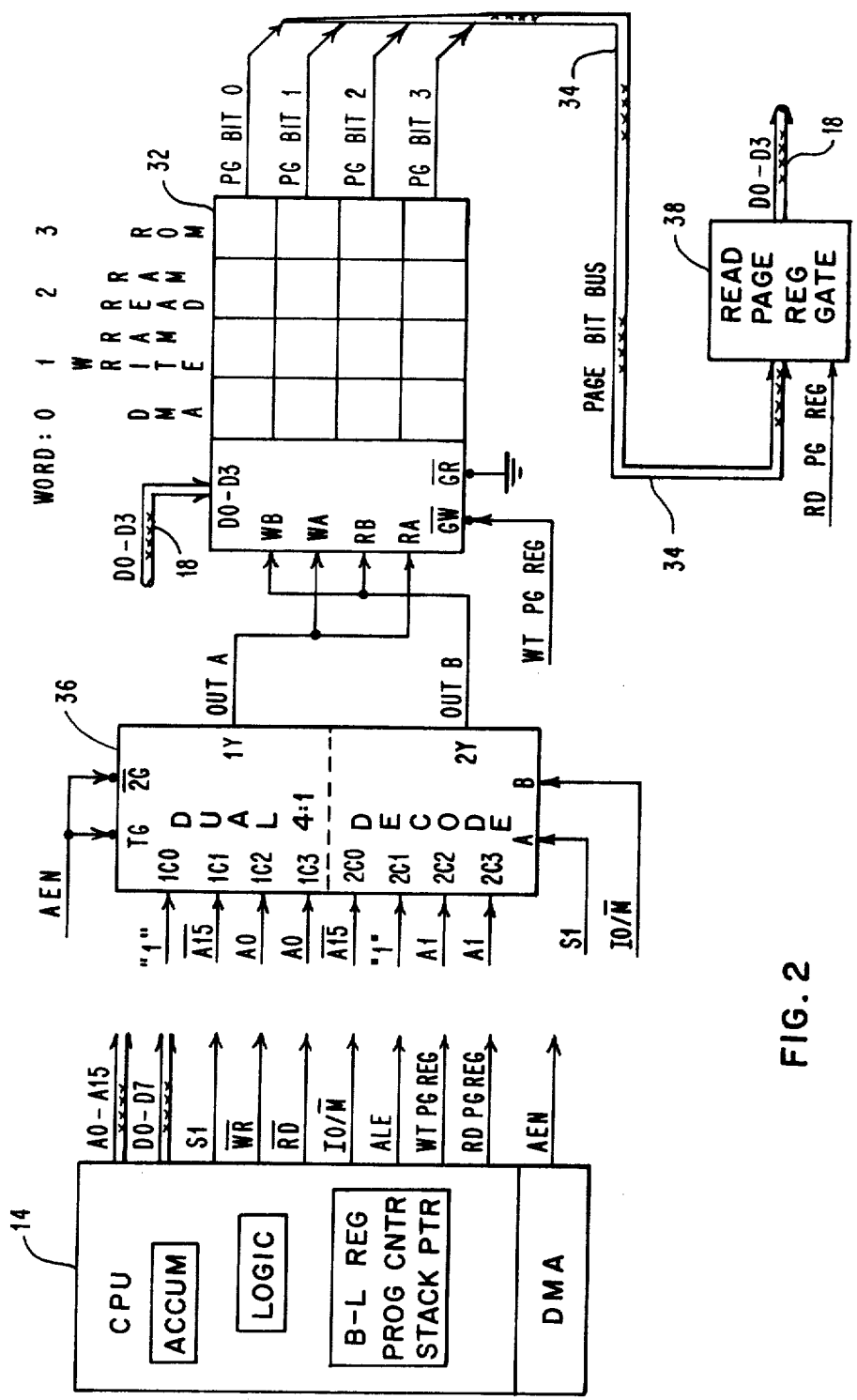
FIG. 2 shows in more detail the central processor unit and the paged bit generating means of the addressing circuit shown in FIG. 1.

Referring now to FIG. 2. A more detailed diagram of CPU 14, page register decode 36, page registers 32, and read page register gate 38 is shown. CPU 14 consists of a microprocessing unit such as an Intel 8085 microprocessor and a DMA device, such as the Intel 8257, both of which are manufactured and sold by Intel Corp. of Santa Clara, Calif.

The microprocessor includes an accumulator, or A, register and six other temporary storage registers which are identified as the B, C, D, E, H and L registers. These registers can be used individually or in groups of two, such that the B and C registers form one group, the D and E registers form a second group, and the H and L registers form a third group. In addition, there is a program counter, a stack pointer and conventional computer logic in the microprocessor. Reference is made to the manual entitled, "MCS-85 User's Manual", published by Intel Corporation in 1978 for a more complete description of CPU 14.

The microprocessor part of CPU 14 provides a sixteen bit address signal over the address bus 16. The address signals are respectively labeled A0 through A15. In addition, an eight bit data signal is provided over data bus 18 and the eight data bits are labeled respectively D0 through D7. The control bus 20 from CPU 14 consists of at least the S1, the I0/$\overline{M}$, and ALE signals, all of which are well known and described in detail in the aforementioned "MCS-85 User's Manual". More specifically, the S1 signal is a data bus status signal and when it is in a logic "0"state, it indicates that either a halt or write function is occuring and when it is in a logic "1"state, it indicates that a read or fetch function is occurring. Similarly the I0/$\overline{M}$ signal indicates whether the read/write function is directed to memory or to Input/Output (I/0) device. When I0/$\overline{M}$ signal is logic "1", the information on the data bus is designated for an I/0 device and when the I0/$\overline{M}$ signal is logic "0", the information on the data bus is designated for the memory. It should be noted that the I0/$\overline{M}$ signal is in the high impedance state during the hold or halt instructions.

The ALE signal is an address latch enable signal which occurs during the first clock cycle of a machine state and enables the address to be latched. As used for the present invention, the ALE signal is for the purpose of specifying when the sixteen bits on address bus 16 are all valid. In addition, the microprocessor position of CPU 14 provides conventional read RD)/ , and write WR)/ control signals. Input output device addressing circuitry can be included within CPU 14 to respond to the $\overline{RD}$ and $\overline{WR}$ signals to provide the RD PG REG and WT PG REG signals. The output from the DMA portion of CPU 14 is the AEN signal which signifies that a DMA transfer is occuring. Normally this signal is logic "0", but becomes logic "1" during a DMA operation and is used to disable the system data and control buses during the DMA operation.

Page register decode 36 is a conventional dual four-to-one decoder such as the SN74LS153 circuit module manufactured and sold by Texas Instruments, Inc. of Dallas, Tex., and which is described in the book entitled, "The TTL Data Book for Design Engineers", published by Texas Instruments, Inc. in 1978. Specifically, each of the two four-to-one decode circuits have four signals applied to the C0 through C3 inputs and provide one of those four signals at the Y output thereof, so long as the strobe signal of G input has a logic "0" signal applied thereto. The particular one of the input signals applied to the output depends upon the state of the signals applied to the select, or A and B, inputs. Specifically, if the two signals applied to the A and B inputs are both logic "0", the C0 input signal is applied as the Y output signal. If the signals applied to the A and B inputs are respectively logic "1" and logic "0", then the C1 input signal becomes the Y output signal.

If the signals applied to the A and B inputs are respectively logic "0" and the logic "1", then the C2 input signal becomes the Y output signal and if both the A and B signals are logic "1", then the C3 input signal becomes the Y output signal. As coupled in page register decode circuit 36, two four-to-one decode circuits are utilized, both of which are provided in the single SN74LS153 module. The 1C0 through 1C3 inputs of the upper four-to-one decode circuit are respectively coupled to a logic "1" signal, the $\overline{A15}$ signal, the A0 signal, and A0 signal. The lower four inputs, 2C0 through 2C3, are respectively coupled to the $\overline{A15}$ signal, a logic "1" signal, the A1 signal and the A1 signal. The strobe signals $\overline{1G}$ and $\overline{2G}$ for both portions are connected to the AEN signal from the DMA portion of CPU 14 and the A and B select signals are respectively coupled to the S1 and I0/M signal from the microprocessor portion of CPU 14. The Y output of the upper four-to-one decode circuit is labeled the OUT A signal and the Y output from the lower portion of the four-to-one decode circuits is labeled the OUT B signal.

Page registers 32 consists of a 4×4 register file, such as the SN74LS670 module manufactured and sold by Texas Instruments, Inc. of Dallas, Tex., and described in the aforementioned book, "The TTL Data Book for Design Engineers". Briefly, page registers 32 consists of a sixteen bit register file organized as four words of four bits each and further consists of on chip decoding providing for the addressing the four word locations in either a write in or read out mode. This permits simultaneous writing into one location and reading from another location, if desired.

The four low order data bus 18 bits D0 through D3 are applied to the data input of page registers 32. In addition, six control signals are applied to inputs, respectively labeled WB, WA, RB, Ra, $\overline{GW}$ and $\overline{GR}$. The signals applied to the WA and WB inputs control which one of the four words will have new data written therein as long as an active logic "0"signal is applied to the $\overline{GW}$ input. The signals applied to the RA and RB inputs control which one of the four words will be read whenever an active logic "0" is applied to the $\overline{GR}$ input. As seen in FIG. 2, the $\overline{GR}$ input is placed at a logic "0" state by grounding and thus at any given time, one word consisting of four bits will always be read and applied at the PG BIT 0 through 4 signals on page bit bus 34.

In operation, if logic "0" signals are applied to both the WA and WB inputs and the $\overline{GW}$ input is at logic "0", then the word 0 contained within the 4×4 file of page registers 32 will have the data applied over lines D0 through D3 of data bus 18 written therein. As shown schematically, in FIG. 2, word zero is in the left-most word and, as will be explained hereafter, is designated as the DMA page register. Similarly, if WA is logic "1" and WA is logic "0", then word 1 will have data written therein; if WA is logic "0" and WB is logic "1," word 2 will have data written therein; and if both WA and WB are logic "1", word 3 will have the data written therein. Again, as will be explained in more detail hereafter, word 1 is designated as the Write RAM page register, Word 2 is designated as the Read RAM page register, and Word 3 is designated as the ROM page register. In writing, it should be noted that it is always necessary to apply a logic "0" signal to the $\overline{GW}$ output or the signals applied to the WA and WB inputs will be ignored.

Since the $\overline{GR}$ input is connected to ground, or logic "0", the signals applied to the RA and RB inputs will cause one of the four 4 bit words contained in the 4×4 file of page registers 32 to always be read. Thus, a 4 bit signal will always be applied as the PG BIT 0-3 signals on bus 34. Again, if both RA and RB are logic "0", then word 0 or the DMA page register, is read. If RA is logic "1" and RB is logic "0", then word 1 or the Write RAM page register is read. If RA is logic "0" and RB is logic "1", then word 2, or the Read RAM page register, is read. And finally, if both RA and RB inputs have logic "1" signals supplied thereto, then the word 3, or the ROM page register, is read.

Four page bits from the particular one of the four words of the 4×4 file containing page registers 32 are applied as the PG BIT 0-3 signals on page bits bus 34. Each line of bus 34 is applied as one input to one of four gates within read page register gate 38. The other input of each gate has applied thereto the RD PG REG signal from CPU 14 to enable the gates to provide the PG BIT 0-3 signals to the data bus 18. Thus, read page register gate 38 allows CPU 14 to read the page signal information read from page registers 34.

The RA and WA inputs to page registers 32 are both connected to the OUTA signal from page register decode 36. The RB and WB inputs to page registers 32 are both connected to the OUTB output from page register to code 36. Connected in this manner, the signals at the outputs of page register decode 36 control the particular word which is read from the page registers 32 and applied to page bit bus 34 as the PG BIT 0-3 signals. The OUTA and OUTB signals from page register decode 36 will each be one of the signals applied to the C0, C1, C2 or C3 inputs of the two parts of page register decode 36, depending on the state of the S1 and IO/$\overline{\text{M}}$ bar signals applied to the A and B inputs or the AEN signal applied to the $\overline{\text{1G}}$ and $\overline{\text{2G}}$ inputs. In the case of a DMA operation, the AEN signal becomes logic "1", thereby causing the OUTA and OUTB signals to both become logic "0". These signals, when applied to the RA and RB inputs of page registers 32, cause the DMA page register, or word 0, to be read and the bits stored therein become the PG BIT 0-3 signals applied to page bit bus 34. In the event it is desired to write information into the random access memory, the S1 signal becomes logic "0" and the IO/$\overline{\text{M}}$ signal is logic "0". In this event, the C0 inputs to both portions of the four-to-one decode circuits making up page register decode 36 become the OUTA and OUTB signals. In other words, the OUTA signal becomes logic "1" and the OUTB signal becomes the value of signal $\overline{\text{A15}}$ which is the complement of the signal on address line 15. In the case of the random access memory, the organization is such that the $\overline{\text{A15}}$ signal will be logic "0" when this part of the memory is accessed. Thus, the OUTB signal will be logic "0" for a write to RAM memory operation. This, in turn, makes the RA signal logic "1" and the RB signal logic "0" and, hence, word 1 or the Write to RAM page register is selected to be read and provide the PG BIT 0-3 to the page bits bus 34.

For a read from memory operation, the S1 signal is logic "1" and the IO/$\overline{\text{M}}$ signal is logic "0". In this case, the C1 input to the two parts of the dual four-to-one decode circuit within page register decode 36 is selected and the OUTA signal becomes the $\overline{\text{A15}}$ signal and the OUTB signal becomes a logic "1". If the read is from the random access memory, $\overline{\text{A15}}$ is logic "0" and, hence, word 2, or the read from RAM, of page registers 32 will be selected. On the other hand, if the read is from the ROM part of the memory, the $\overline{\text{A15}}$ signal will be logic "1" and, hence, word 3, or the ROM page register, will be selected.

Connected in this manner, it is seen that the sequence of instructions, such as reading a program instruction from the ROM followed by a reading of data from one page of the RAM and writing of data into a different page of the RAM, can automatically occur without the necessity of setting a page register between each instruction. In other words, the ROM page register, the Read RAM page register and the Write RAM page register are all initially set and then the sequence of instructions just described is expected and automatically causes the appropriate page bits to be provided for the desired function. In this same manner, if a DMA operation is included, a separate set of page bits can be provided in the DMA page register, thereby eliminating the requirement of resetting that page register each time a DMA operation occurs.

Whenever it is desired to write new information into the page registers 32 or for CPU 14 to read the information stored by page registers 32, page registers 32 are treated as an input output, or I/0 device. In this case, the IO/$\overline{\text{M}}$ signal becomes logic "1" and the S1 signal will be logic "0" or logic "1", depending upon whether information is being written into or read from page registers 32. In either case, the OUTA signal becomes the A0 address signal and the OUTB signal becomes the A1 address signal. By appropriately addressing page registers 32 with the A0 and A1 address signals, either of the four words can be read or written over, in conjunction with the provision of the WT PG REG signal or the RD PG REG signal from CPU 14.

Figure 3A:
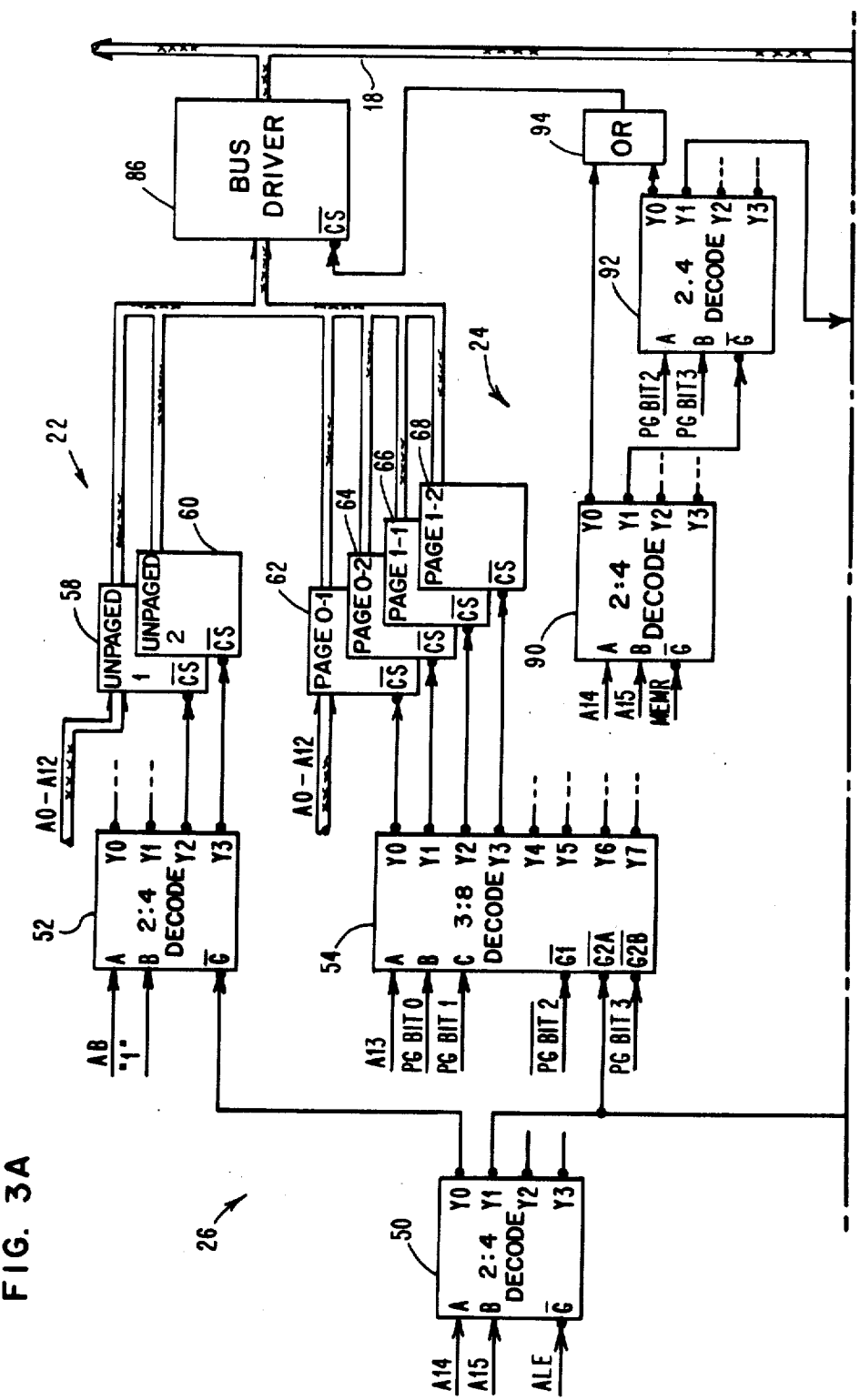
FIG. 3 shows in more detail the read only memory and the address decoding circuit therefore, shown in FIG. 1.
Figures 3, 3B:
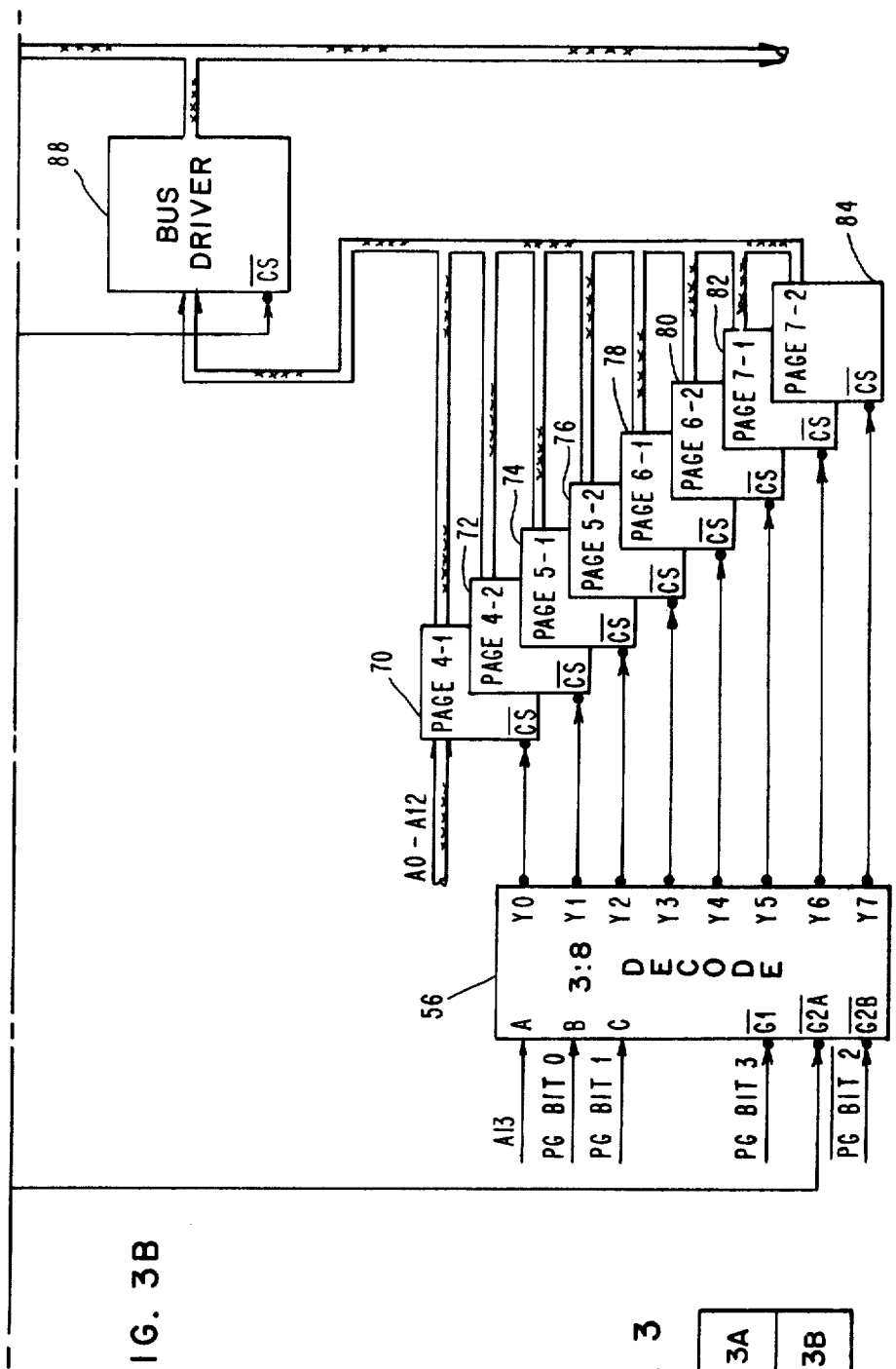

Referring now to FIG. 3, a more detailed diagram of the ROM address to decode circuit 26 is shown in conjunction with the base ROM 22 and the paged ROM 24 of the memory 12. ROM address decode 26 includes a pair of two-to-four decode circuits 50 and 52 and a pair of three-to-eight decode logic circuits 54 and 56. As shown in FIG. 3, only pages 0, 1, 4, 5, 6 and 7 are shown for paged ROM 24, it being understood that any number of pages up to sixteen can be used. As previously explained with respect to FIG. 1, the unpaged ROM 22 includes 16K bytes in address space 0-16K and each page of the paged ROM 24 of the ROM memory includes 16K bytes in address space 16K-32K. However, in actually constructing the system, two circuit modules of 8K bytes may be used for the unpaged ROM 22 and for each page of the paged ROM 24. Thus, the unpaged ROM 22 includes first section 58 and second section 60, each of which are 8K bytes in size. Similarly, page 0 of the paged ROM 24 includes section 62 and section 64. The same is true for each of the other pages wherein page 1 includes sections 66 and 68, page 4 includes sections 70 and 72, page 5 includes sections 74 and 76, page 6 includes sections 78 and 80 and page 7 includes sections 82 and 84.

Two-to-four decode circuit 52 is utilized to select which of the two sections 58 or 60 of the unpaged ROM 22 is to be addressed by the A0 through A12 address signals. Three-to-eight decode circuit 54 is utilized to select which one of the four sections 62, 64, 66 and 68 of pages 0 and 1 are to be addressed by the address signals A0 through A12 on address bus 16. Three-to-eight decode circuit 56 is utilized to determine which one of the sections 70, 72, 74, 76, 78, 80, 82 and 84 of pages 4, 5, 6 or 7 are to be addressed by the address signals A0 through A12 on address bus 16.

Two-to-four decode circuit 50 is utilized to select whether unpaged ROM 22 or paged ROM 24 is to be addressed. Two-to-four decode circuit 50 and two-to-four decode circuit 52 may be circuit modules 74LS139 manufactured and sold by Texas Instruments, Inc. of Dallas, Tex., and three-to-eight decode circuits 54 and 56 may be conventional 74LS138 circuit modules also sold and manufactured by Texas Instruments, Inc.

The A and B inputs to two-to-four decode circuit 50 are respectively coupled to the A14 and A15 signals provided over address bus 16. The $\overline{\text{G}}$, or enable, input to two-to-four decode circuit 50 is connected to the ALE signal provided from CPU 14 at the beginning of each cycle of operation of CPU 14. When both the A14 and A15 signals are logic "0", the Y0 output from two-to-four decode circuit 50 becomes logic "0"; otherwise, it is logic "1". When the A14 signal is logic "1" and the A15 signal is logic "0", the Y1 output from two-to-four decode circuit 50 becomes logic "0"; otherwise, it is logic "1". The Y2 and Y3 outputs from two-to-four decode circuit 50 are unconnected, as shown in FIG. 3. The Y0 output from two-to-four decode circuit 50 is coupled to the $\overline{\text{G}}$, or enable, input of two-to-four decode circuit 52. Whenever the Y0 signal from two-to-four decode circuit 50 is logic "0", two-to-four decode circuit 52 is enabled. The A and B inputs of two-to-four decode circuit 52 are respectively coupled to the A13 address signal and to a logic "1" signal. When two-to-four decode circuit 52 is enabled and if the A13 signal applied to the A input is a logic "0", then the Y2 output from two-to-four decode circuit 52 becomes logic "0". If the A13 signal is a logic "1", the Y3 output from two-to-four decode circuit 52 becomes a logic "0". The Y2 signal from circuit 52 is provided to the chip select input of section 58 of unpaged ROM 22 and the Y3 output from circuit 52 is applied to the chip select input of section 60 of unpaged ROM 22. Whenever a logic "0" signal is applied to the chip select input of one of the ROM sections 58, 60, that particular section is enabled to respond to the address signals A0 through A12 on address bus 16. In response to these address signals and the chip select enabling signal, eight bits of data contained in the address location are provided at the output of the enabled section.

The Y1 output of two-to-four decode circuit 50 is coupled to the $\overline{G2A}$ inputs of both three-to-eight decode circuits 54 and 56. In addition, the A, B, and C inputs to each of circuits 54 and 56 are respectively coupled to the A13 address signal and the PG BIT0 and PG BIT1 page bit signals from page registers 32. The $\overline{G1}$ input to circuit 54 is coupled to the $\overline{PGBIT2}$/ signal and the $\overline{G2B}$ input to circuit 54 is connected to the PG BIT3 signal. The $\overline{G1}$ input to circuit 56 is coupled to the PG BIT3 signal and the $\overline{G2B}$ input to circuit 56 is coupled to the $\overline{PGBIT2}$/ signal.

The Y0 through Y3 outputs from circuit 54 are respectively coupled to the chip select CS)/ inputs of the page 0 and page 1 sections 62, 65, 66 and 68. The Y4 through 7 outputs of circuit 54 are unconnected. The Y0 through Y7 outputs of circuit 56 are respectively coupled to the chip select CS)/ inputs of page 4, page 5, page 6 and page 7 sections 70, 72, 74, 76, 78, 80, 82 and 84. Each of the paged ROM sections respond to address bits A0 through A12 applied thereto over address bus 16 and provides an 8 bit output signal containing the addressed data when that particular module is selected by an appropriate logic "0" signal from circuit 54 or 56.

The data outputs from each of ROM sections 58, 60, 62, 64, 66 and 68 are coupled together and applied to the data input of bus driver circuit 86. In the same manner, the data outputs from each of the modules 72, 74, 76, 78, 80, 82 and 84 are coupled together and applied to the data input of bus driver 88. Bus driver circuits 86 and 88 may be conventional 74LS244 driver circuits manufactured and sold by Texas Instruments, Inc. of Dallas, Tex. At any given time, only one of these circuits, 86 or 88, may be enabled by the operation of a pair of two-to-four decoders 90 and 92 and OR gate 94. Two-to-four decoders 90 and 92 may be conventional 74LS139 circuits and OR gate 94 may be a 74LS08 circuit having inverted logic inputs and an inverted logic output. The A and B inputs to decode circuit 90 are respectively coupled to the A14 and A15 signals and the enable, or $\overline{G}$ input to circuit 90 is coupled to the MEMR signal, which may be generated by means (not shown) responsive to both the $\overline{RD}$ and IO/$\overline{M}$ signals from CPU 14 whenever it is desired to read information from the memory. The Y0 output from decode circuit 90 is coupled as one input to OR gate 94 and the Y1 output from decode circuit 90 is coupled to the enable, or $\overline{G}$, input of two-to-four decode circuit 92. The A and B inputs to decode circuit 92 are respectively coupled to the PG BIT2 and PG BIT3 signals from page registers 32. The Y0 output from decode circuit 92 is coupled as the second input to OR gate 94 and the Y1 output from decode circuit 92 is coupled to the chip select CS)/ input of bus driver 88. The output of OR gate 94 is coupled to the chip select CS)/ input of bus driver 86. Connected in this manner whenever information is read from one of thw ROM sections 58, 60, 62, 64, 66 or 68, bus drive 86 is enabled and whenever information is read from one of the ROM sections 70, 72, 74, 76, 78, 80, 82 or 84, bus driver 88 is enabled. The output of each of bus drivers 86 and 88 is connected to the data bus 18, which carries the D0 through D7 data signals.

Figure 4:
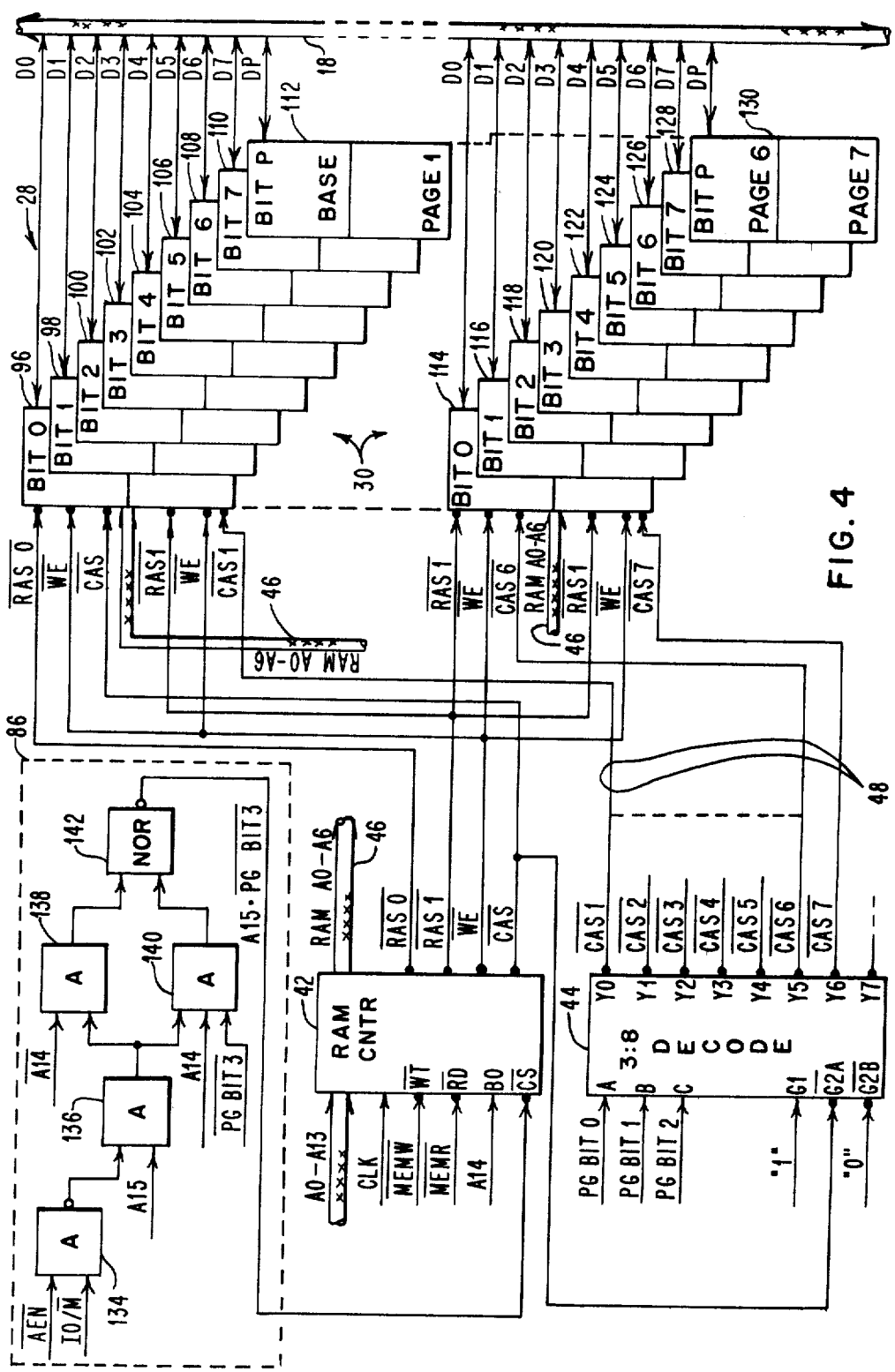
FIG. 4 shows in more detail the random access memory and controller and decoding circuit therefore shown in FIG. 1.

Referring now to FIG. 4, RAM controller 42, CAS decode 44, unpaged RAM 28 and the paged RAM 30 are shown in more detail. RAM controller 42 may be a conventional RAM memory controller, such as the Intel 8202 random access memory controller, manufactured and sold by Intel Corp. of Santa Clara, Calif. RAM controller 42 is enabled by a logic "0" signal being applied to the $\overline{CS}$ or chip select input thereof from logic circuit 86. This signal, as will be explained in more detail hereafter, is provided when the A15 address signal is logic "1" and the PG BIT3 signal is logic "0" or in other words, when the random access memory 28 and 30 is selected As shown in FIG. 4, there is one unpaged block of 16K RAM and seven paged blocks of 16K RAM. Thus, only three PG BITS0-2 of the four paged register 32 signals PG BIT0-3 are required. Hence, under normal operations, the PG BIT3 signal is always kept at logic "0".

RAM controller 42 includes an address bus input to which the A0 through A13 address signals are applied. In addition, there is a clock input to which the system clock of 16.432 megahertz is applied, a write WT)/ input to which the $\overline{MEMW}$ signal is applied, a read RD)/ input to which the $\overline{MEMR}$ signal is applied, a B0 input to which the A14 address signal is applied, and the chip select CS)/ input to which the output of logic 86 is applied. The $\overline{MEMW}$ signal is provided by logic (not shown) responsive to the $\overline{WR}$ and IO/$\overline{M}$ signals from CPU 14, whenever these signals indicate that a memory write operation is to occur.

The outputs of RAM controller 42 include the RAM address bus 46 having the RAM A0 through RAM A6 address signals provided thereon. In addition, the outputs include a $\overline{RAS0}$, $\overline{RAS1}$, $\overline{WE}$ (Write Enable) and $\overline{CAS}$ signals. The $\overline{RAS0}$ and $\overline{RAS1}$ signals are provided as row address strobes and the particular one provided is determined by the value of the A14 signal applied to the B0 input. If A14 is logic "0" then, the $\overline{RAS0}$ signal is active. If A14 is logic "1", the $\overline{RAS1}$ signal is active. The $\overline{CAS}$ signal is a column address strobe signal and is applied to CAS decode circuit 44 which may be a three-to-eight decoder, such as the 74LS138 circuit manufactured and sold by Texas Instruments, Inc.

The A, B and C inputs of three-to-eight decoder 44 are respectively coupled to the PG BIT0, PG BIT1 and PG BIT2 signals provided from page register 32. The G1 input of three-to-eight decode circuit 44 is a logic "1" signal and the $\overline{G2B}$ signal is a logic "0". The $\overline{CAS}$ signal from RAM controller 42 is applied to the $\overline{G2A}$ input. The seven least significant outputs Y0-Y6 of three-to-eight decode circuit 44 are utilized and respectively provide the $\overline{CAS1}$ through $\overline{CAS7}$ signals on CAS bus 48.

The organization of the RAM 28 and 30 is somewhat different in details than the organization of the ROM 22 and 24 shown in FIG. 3. Each memory module designated 96 through 130 (even numbers only) of the RAM 28 and 30 is a 32K by 1 bit module and consists of two 16K by 1 bit circuits. Each circuit is responsive to the RAM A0 through A6 address signals, the $\overline{WE}$ signal and to a $\overline{CASX}$ and $\overline{RASX}$ signal. In each block (paged or unpaged) of RAM memory, there is one circuit from each of nine individual modules, such as 96-112 (even numbers only), for providing the D0 through D7 signals plus an additional parity bit signal labeled DP. The parity bit DP is used by circuitry (not shown) in a conventional manner to determine the parity of the data provided to or from RAM memory 28 or 30.

In FIG. 4 64K bytes of random access memory are shown and divided into a ≠K byte unpaged base, or RAM 28 and seven pages of 16K bytes each of paged RAM 30. It should be noted that pages 3–5 inclusive are represented by the dashed lines in FIG. 4. Each of the memory modules 96–130 (even numbers) is divided in half so that one 16K circuit therein is part of either the base of one page and the other 16K circuit therein is part of a different page. As previously mentioned, each 16K block of memory responds to address lines RAMA0-6, a $\overline{RASX}$ signal, the $\overline{WE}$ signal and a $\overline{CASX}$ signal. For instance, the unpaged RAM 28 block is shown in the upper half of modules 96–112 (even numbers) and responds to the $\overline{RAS0}$ $\overline{WE}$ and the $\overline{CAS}$ signals as well as the RAM address bus 46 signals RAMA0-6. The lower of the module 96–112 (even numbers only) contain page 1 of paged RAM 30 and respond to the $\overline{RAS1}$ $\overline{WE}$ and $\overline{CAS1}$ signals together with the RAM address signals RAMA0-6 on bus 46. For page 6, shown as the upper half of modules 114–130 (even numbers only), the $\overline{RAS1}$, $\overline{WE}$ and $\overline{CAS6}$ signals are applied to each of the nine 16K by 1 bit circuits of modules 114–130 (even numbers). In the same manner, the $\overline{RAS1}$, $\overline{WE}$ and $\overline{CAS7}$ signals are applied to page 7. In each case, the RAM address signals RAMA0-6 on RAM address bus 46 are also applied to each circuit. In general, for the unpaged base RAM 28, the $\overline{RAS0}$ and $\overline{CAS}$ signals are applied; and for the various pages of the paged portion, and $\overline{RAS1}$ signal is applied to each page and one of the $\overline{CAS1}$ through $\overline{CAS7}$ signals from CAS decode 44 is applied to pages 1–7 respectively. Thus, it is seen that the $\overline{RAS0}$ and $\overline{RAS1}$ signals are used to determine whether base RAM 28 or paged RAM 30 is to be accessed and the $\overline{CAS}$ and $\overline{CAS1}$ through $\overline{CAS7}$ signals are used to determine which page is to be accessed.

Circuit 86, as previously mentioned, provides the chip select signal to RAM controller 42. Circuit 86 consists of NAND gate 134, AND gates 136, 138 and 140, and NOR gate 142. The two inputs to NAND gate 134 are the $\overline{AEN}$ signal from the DMA portion of CPU 14 and the IO/$\overline{M}$ signal from CPU 14. The output of NAND gate 134 is applied as one input to AND gate 136, the other input of which is the $\overline{A15}$ address signal. The output of AND gate 136 is applied to one input of each of AND gates 138 and 140. The other input to AND gate 138 is the $\overline{A14}$ signal and the other two inputs to AND gate 140 are respectively the A14 address signal and the $\overline{PGBIT3/}$ signal. The output of each of AND gates 138 and 140 are applied as the two inputs to NOR gate 142, which provides the signal to the chip select input of RAM controller 42. Coupled in this manner, the output of NOR gate 142 will be logic "0" whenever the A15 address signal is logic "1" and the PG BIT3 signal is logic "0".

Figure 5:
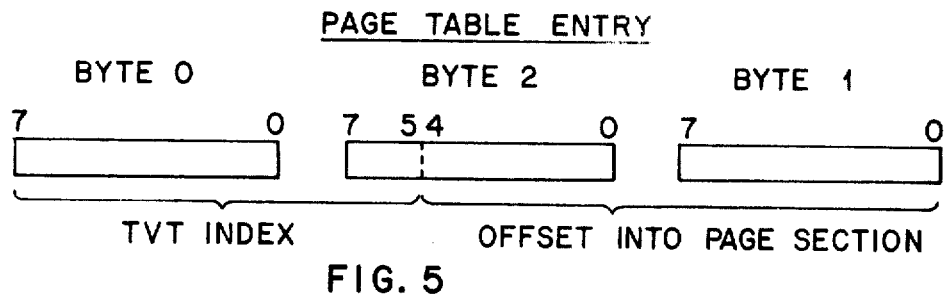
FIG. 5 shows a page table entry.
Figure 6:
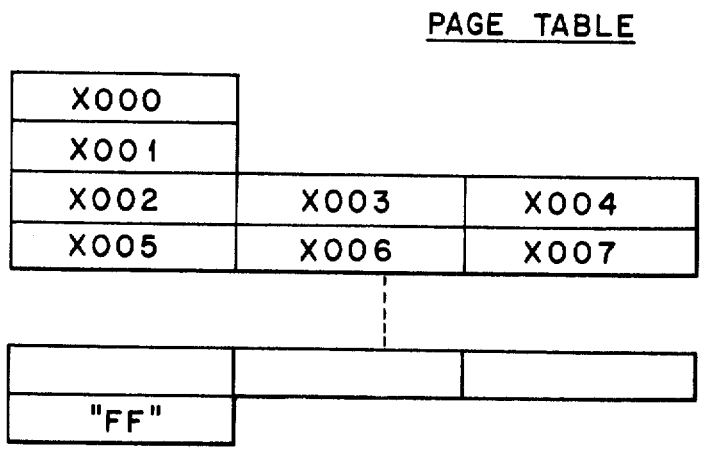
FIG. 6 shows the organization of the page table within one page section.
Figure 7:
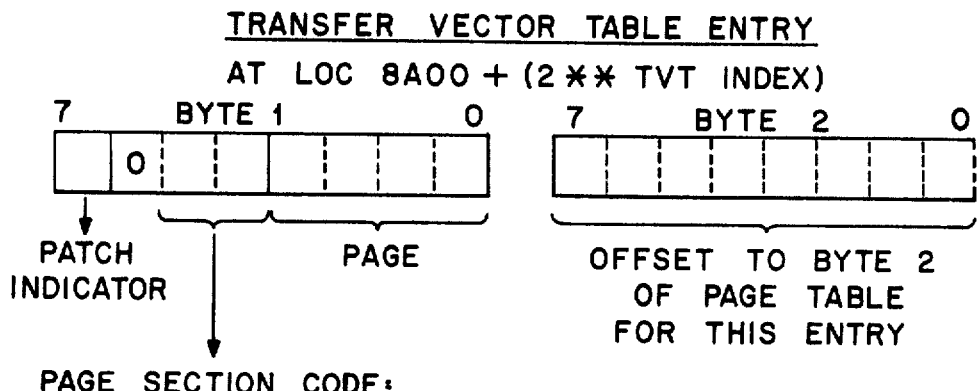
FIG. 7 shows a transfer vector table entry.

Referring now to FIGS. 5 through 10, one technique for utilizing the paging structure shown in FIGS. 1 through 4 will now be described. Specifically, FIGS. 5 and 6 show diagrams useful in understanding the page table, which is present in each section of paged ROM 24 as well as in section 2 of unpaged ROM 22. FIG. 7 shows a diagram useful in understanding the organization of the transfer vector table, which is built from the information stored in the page tables of each section of ROM 22 and 24 and which is present in a part of the unpaged portion of RAM 28.

FIG. 5 shows one entry of a page table. Each page table entry consists of three bytes of information or 24 bits in total. Eleven of the 24 bits are utilized for containing a code referred to as the TVT index. The TVT index is a unique number for each program module. The remaining thirteen bits of information in the page table entry contain a number which is an offset into that paged section defining the exact location of the program module identified by the TVT index. The particular organization is such that the high eight bits of the TVT index are contained in byte zero of the page table entry and the low three bits are contained as bits 5, 6, and 7 of byte two. The high five bits of the offset are contained in bits zero through 4 of byte two and the low eight bits are contained in byte one, of the page table entry.

FIG. 6 shows the organization of a paged table. The first two bytes in any paged section are located in addresses X000 and X001, where X=2, 4 or 6 and corresponds to the section code. Those bytes contain the high value of the first address and the high value of last address plus one of that page section. These values are used in the initialization procedures for performing certain checks on the memory to insure that it operates properly. As such, they form no part of the present invention. Beginning with hexadecimal location X002, the first three byte page table entry occurs. The second page table entry then begins at location X005 and so forth, so that there is one entry for each program module contained in that particular ROM section. In the location immediately following the last or Nth page table entry, the data code hexadecimal "FF" is entered to mark the end of the page table. In the location immediately following the end of table marker, the code for the first program instruction of the first program module exists.

Referring now to FIG. 7, one entry in the transfer vector table is shown. The transfer vector table is located in a block of unpaged random access memory 30 beginning, for instance, at location 8A00 and includes a two byte entry for each page table entry in all of the sections of paged and the one section of unpaged memory. The transfer vector table entries are each placed in a memory location corresponding to the TVT index code, such that twice the TVT index is added to hexadecimal location 8A00. For each entry, bit 0 through 3 of byte 1 contain the page number and bits 4 and 5 contain the section code X for that page. For bits 4 and 5 the code "00" is not used; the code "01" indicates a 2000 page section, or the second part of the unpaged or base ROM 22; the code of "10" indicates a 4000 address in the page section or, in other words, the low addressed half of each page; the code "11" indicates a 6000 address in the page section or the high addressed half of each page. Bit 6 of byte 1 is always set equal to "0" and bit 7 is utilized as a patch indicator, whereby if it is a logic "1", a patch is indicated. As used herein, a patch occurs if a given program module in the ROM is replaced by a substitute program stored in the RAM. This normally occurs if a desired change to the ROM program module is made after the program has been placed in the ROM and cannot be easily changed. This may occur, for instance, if an error exists in the ROM program module.

Byte 2 of the transfer vector table entry contains an offset to the location of the second byte of the page table entry for the page and section indentified in byte 1 of the transfer vector table entry. Thus, there becomes a practical limit of 84 entries which can be contained in the page table for each section.

Figure 8:
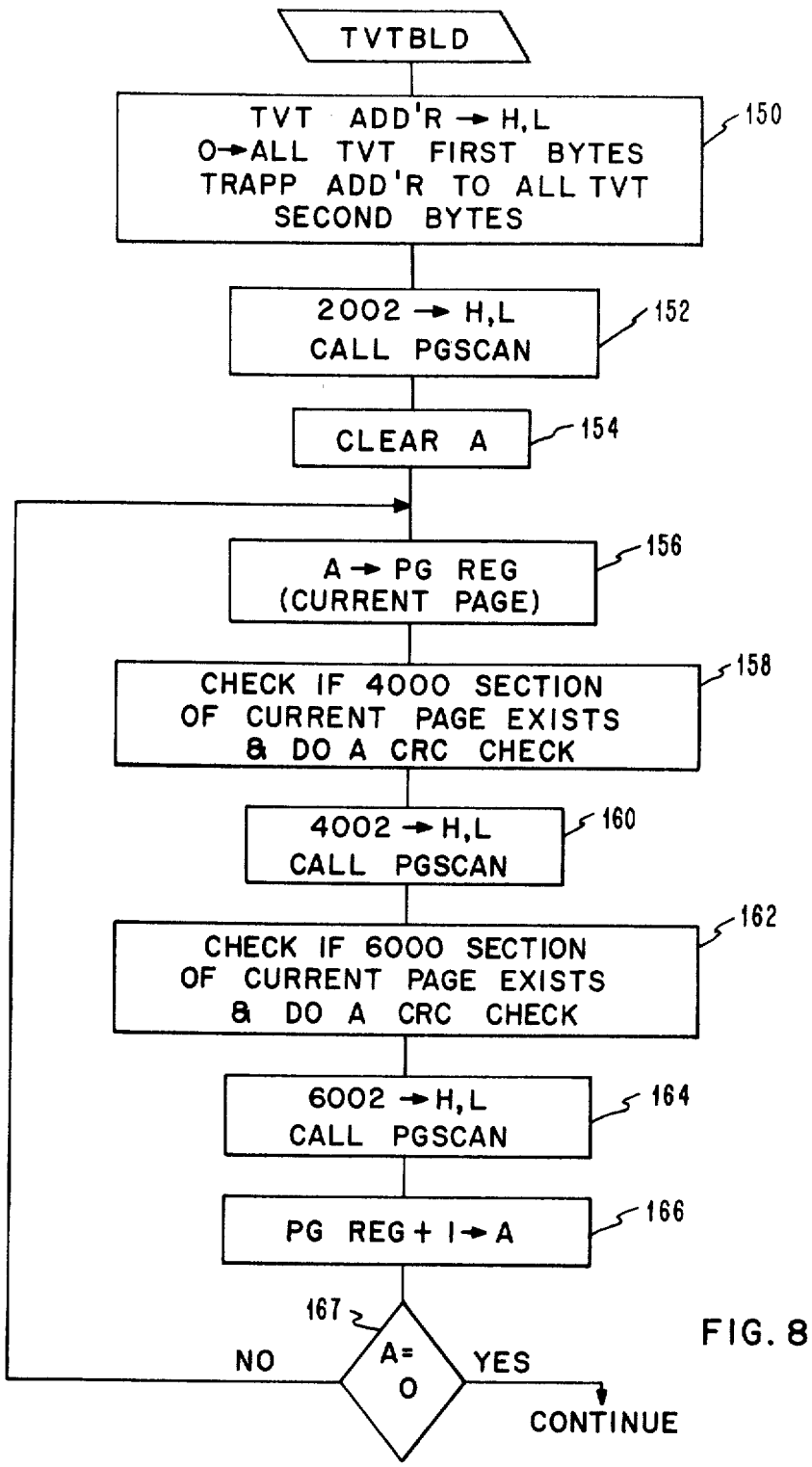
FIG. 8 shows a flow diagram representing a series of program instructions used for building the transfer vector table.
Figure 9:
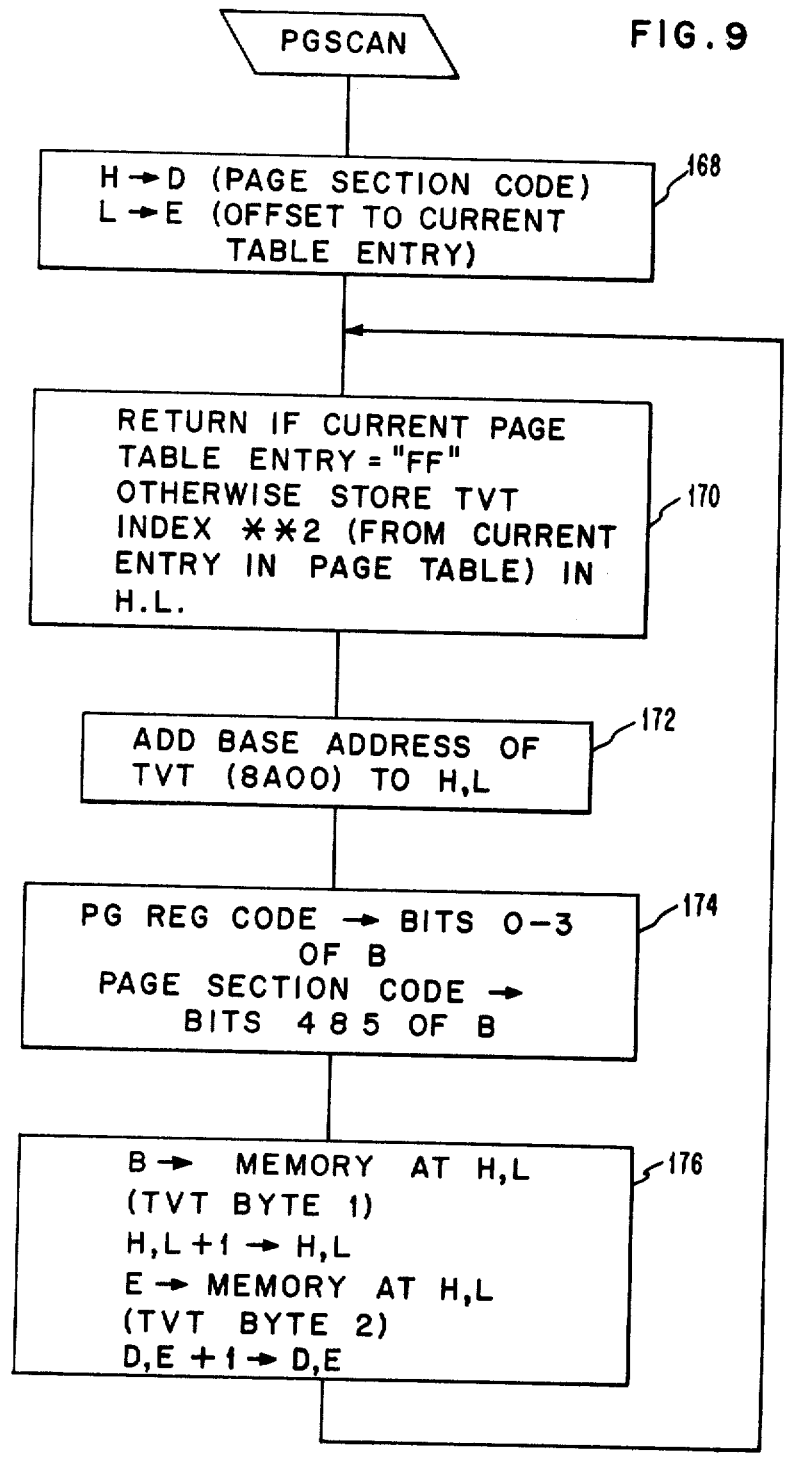
FIG. 9 shows a flow diagram representing a series of program instructions used in scanning the page table in each page section of program storage memory.

FIGS. 8 and 9 show a flow diagram of a computer program which may be used to build the transfer vector table from the information contained in the page tables. The two programs shown by FIGS. 8 and 9 are respectively labeled TVTBLD and PGSCAN. The actual source coding for an 8085 microprocessor used as the heart of CPU 14 corresponds to the flow diagrams of FIGS. 8 and 9. Both of those programs are performed as part of the initialization procedures during a power up sequence. Thus, each time power is applied to the system, the transfer vector table is built according to the TVTBLD program. The TVTBLD and PGSCAN programs are physically placed in section 1 of the unpaged ROM 58.

Referring now specifically to FIG. 8, the first thing which occurs, according to block 150, is that the address of the first location of the transfer vector table (TVT) is stored in the HL registers of the 8085 microprocessor within CPU 14. As previously memtioned, this address may be hexadecimal 8A00. Next, all of the first bytes in the TVT table are set equal to zero and the address of the TRAPP program module is stored in the second byte of each TVT entry. This is done for the purpose of providing a jump to an error routine in the event that a particular TVT index does not exist and by mistake a jump to the location for that non-existent index is made. The TRAPP program module is located in the first section 58 of the unpaged ROM 22 and thus the second byte is an offset into section 58 of unpaged ROM 22.

Next according to block 152, the hexadecimal number 2002 is transferred to the HL registers and the subprogram PGSCAN is called. the PGSCAN program is shown in FIG. 9 and will be discussed in detail hereafter. Briefly the PGSCAN program scans the page table for the module addressed by the HL registers and places these scanned entries from one page table into the TVT table in the unpaged RAM 28. Thereafter, according to block 154, the accumulator, or A register, is cleared.

Continuing with block 156, the data stored in the A register is applied over data bus 18 to be stored in the ROM page register. This occurs in conjunction with the WT PG REG signal from CPU 14. This data controls the page to be operated upon by the remainder of the TVTBLD program at this time. Next, according to block 158, a determination is made whether the 4000 section of the page number just sent to the page register 32 exists and, if so, a cycle redundancy check (CRC) is made to determine if that section is accurate. If the CRC check fails, an error is posted.

Then, according to block 160, the hexadecimal address 4002 is transferred to the HL registers and PGSCAN routine is called to scan the page table in the 4000 section of the page contained in the ROM page register as modified at block 156.

Then, according to blocks 162 and 164, the same procedure as was described with respect to blocks 158 and 160 is undertaken for the 6000 section for the page number outputted at block 156.

Then, at block 166, the value stored in the ROM page register in page registers 32 is read and incremented by one and stored in the accumulator. The four most significant bits are then set equal to zero and, according to block 167, a determination is made whether the value stored in the accumulator is equal to zero. If not, a return to block 156 occurs and similar processing results for the new page number determined at block 166. If at block 167 it had been determined that A was equal to zero, indicating that all of the pages had been processed, then a continuation with a remainder of the initialization program occurs.

Referring now to FIG. 9, the PGSCAN program module is described. As recalled from blocks 152, 160 and 164 in FIG. 8, the PGSCAN program is called for the purpose of scanning one entire page table in a section of ROM 22 or 24. This routine is called with the HL registers containing the address of the first entry of the page table, that entry being location 2002 for the second section 60 of the unpaged memory, or location 4002 for the first sections 62, 66, 70, 74, 78 or 82 of the various paged ROM or location 6002 for the second sections 64, 68, 72, 76, 80 and 84 of the various paged ROM 24.

First, according to block 168, the address code in the HL registers is stored in the DF registers. Thus, the D register contains the page section code and the E register contains an offset to the current page table entry within that section. Then, according to block 170, a determination is made whether the paged table entry is equal to hexadecimal "FF", which is the end of table marker, as shown in FIG. 6. If this is the case, a return to the calling program occurs. Otherwise, the TVT index is doubled and stored in the HL registers. The TVT index is obtained from byte 0 and the three most significant bits of byte 2 of the current entry in the paged table addressed by the DE registers. Then, according to block 172, the base address of the TVT table, which is hexadecimal 8A00, is added to the doubled TVT index stored in the HL registers. At this point, the HL registers contain the correct address in the TVT table for the page table entry being scanned.

Thereafter, according to block 174, the ROM page register in page registers 32 is read and the data is stored in bit positions 0–3 of the B register. In addition, the paged section code, which is obtained from the D register, is stored in bit positions 4 and 5 in the B register. Bit positions 6 and 7 are set to 0. Thus, byte 1 of the TVT table entry is contained in the B register. Then, according to block 176, the contents of the B register is stored in the TVT table at the address contained in the HL registers. The HL registers value is then incremented by one and the contents of the E register, which is the offset to the current page table entry, is stored in the TVT table at the address then contained in the HL registers. Thereafter, the contents of the DE register is incremented by one and returned to block 170 occurs and the next page table entry is scanned and transferred to the TVT table. This continues until the end of the table marker is identified at block 170.

Figure 10:
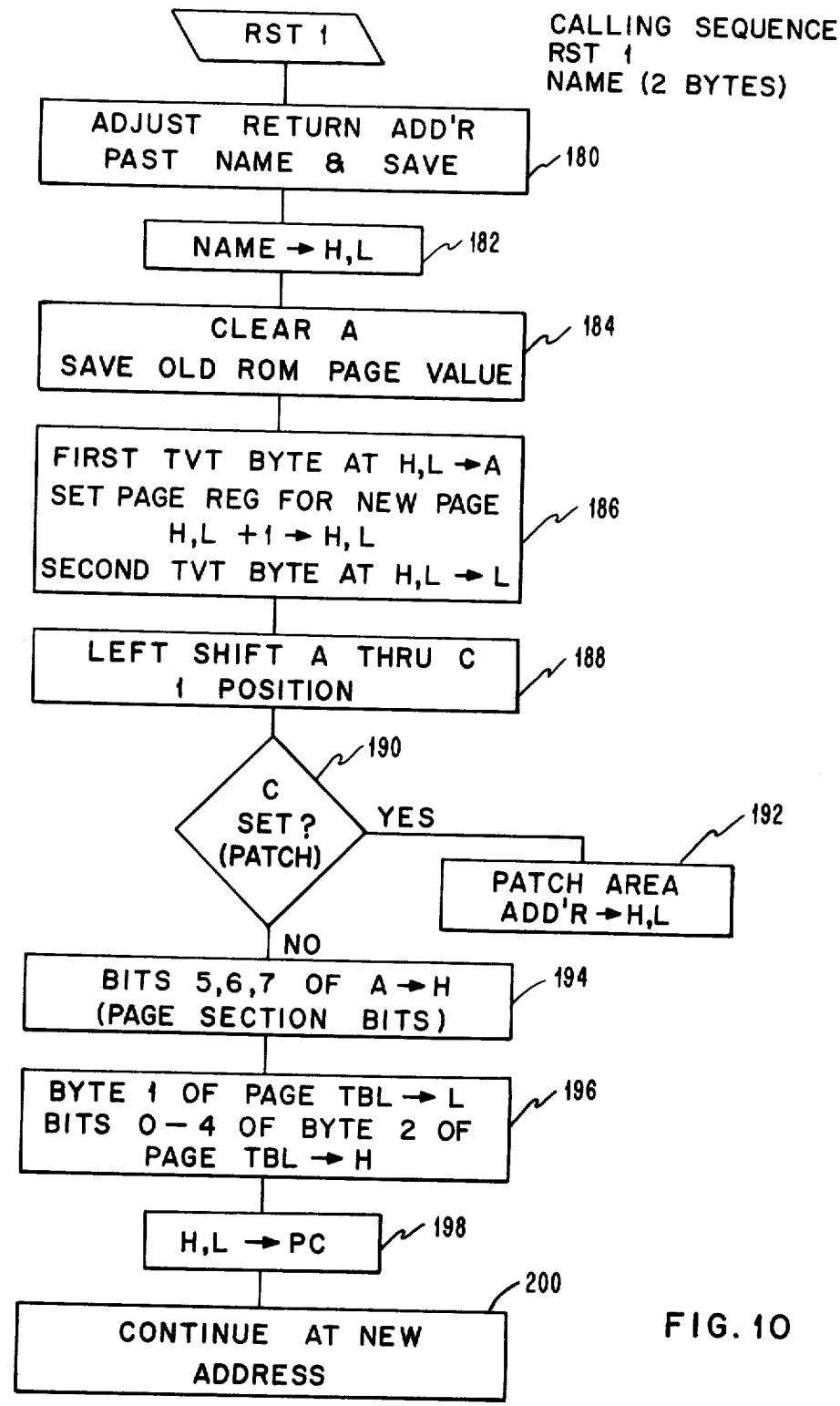
FIG. 10 shows a flow diagram for a sequence of program instructions allowing for the transfer from one program module to another.

Referring now to FIG. 10, the program routine RST1 is shown in a flow diagram format and is used whenever a transfer from one program module to another program module is to occur. In the 8085 microprocessor the RST instruction is used as a restart instruction and automatically causes a predetermined address located in unpaged ROM to be placed in the program counter with the saving of certain information in the stack. On the next machine cycle, the instruction at the predetermined RST location will be executed. The RST1 program shown in FIG. 10 utilizes this feature of the 8085 microprocessor, such that whenever it is desired to cause a transfer from one program module to another, such as by the conventional call instruction or jump instruction, the calling sequence is the RST1 instruction followed by a two byte NAME code which identifies the particular module to be called and contains the address of that program modulus entry in the TVT index table. First, according to block 180, the saved return address which normally is the address immediately following the RST1 instruction is adjusted to the address following the NAME code. Then, according to block 182, bytes 1 and 2 of the NAME code are stored in the HL registers and thus, the HL registers address the desired TVT table entry of the called program. Thereafter, according to block 184, the accumulator, or A register, is cleared and the then existing information in the ROM page register in page registers 32 is read and saved on the stack.

Then, according to block 186, the first TVT table byte, which is then addressed by the HL registers, is read from the random access memory and stored in the A register. The low four bits of information in the A register is then transmitted to page registers 32 to set the ROM page register to the page specified in byte 1 of the TVT index for the called program. Thereafter, the HL register is incremented by 1 and the second TVT byte, as then addressed by the HL registers, is read and stored in the L register. Then, according to block 188, the second TVT byte is left shifted through carry one position and a determination is made at block 190 whether the carry indicator is set.

If it is, a patch is indicated and as indicated in block 192, the patch area address is transferred to the H1 registers and processing continues by transferring the program fetch operation to the patch area of the RAM.

Assuming that the carry indicatior is not set at block 190, then according to block 194, bits 5, 6 and 7 of the A register, which contain the page section bits left shifted one position, are transferred to the H register. At this point in time, the H register contains a code of hexadecimal 20, 40 or 60 and the L register contains the offset to byte 2 of the proper page table entry.

Continuing at block 196, the offset into the paged section contained by byte 1 and bits 0 through 4 of byte 2 of the address page table entry are transferred to the HL registers. It should be noted that the page section bits contained in the H register are maintained during this transfer operation. Thus, the HL registers at this point contains an address of the called program routine. Then, according to block 198, the address contained in the HL registers is transferred to the program counter (PC) in CPU 14 and at block 200, a continuation occurs with the program counter causing the fetching of instructions from the new address therein and execution of the called routine is begun.

Thus, it is seen that by using the simple routine described with respect to FIG. 10, the transfer of instruction execution between pages can be easily accomplished. This technique allows for simplicity in programming because it is not necessary to know the exact location in read only memory of every program module being developed during the development of the software. One merely assigns a unique index code to a particular program module as it is being programmed. Then that program module can be fit into a particular page where room exists and maximum utilization of the memory can be achieved. In addition, the routine allows for correcting the program modules by utilizing a patch technique. If desired, the program modules can also be modified by including all modified program modules in the highest section of ROM. This section's page table is scanned last and if an identical TVT index number exists, the information previously in the TVT table will be written over by the information in the higher ordered ROM section.

Several variations of the use of the paging technique can be made to the technique described above. A three byte TVT entry could be used whereby the actual address of the new program module is stored in bytes two and three. In this instance, direct addressing of the new program module can occur without using the offset in the page table entry.

Another variation involves placing the TVT index of program modules which are frequently called in a special section of the TVT table. Such a special section may be, for example, between locations 8C00 and 8DFF and would contain TVT index between decimal 256 and 511. For these program modules, a different restart instruction would be used, and the NAME code could be a single byte. The single NAME byte is then placed in the L register and hexadecimal 46 is placed in the H register. Then the value in the HL registers are doubled (due to the two byte length of each TVT table entry) and the processing continues as described from block 184 through 200. This procedure saves one byte of storage each time one of these frequently used modules is called.

It should be noted that conventional call and jump instructions may be used when transferring to program modules located in the unpaged ROM 22. Thus, the most frequently called program modules should be placed in unpaged ROM 22 to the extent space is available. This conserves processing time since there is no necessity to refer to the TVT table.

We claim:

1. A data addressing system for addressing data storage means comprising:

processor means which provides control signals and address signals, said control signals manifesting a data movement operation to be performed and said address signals defining addresses within a confined address space, addressable memory means for being addressed within said confined addressable space, said memory means including both read only memory addressable in a first portion of said confined addressable space and random access memory addressable in a second portion of said confined addressable space, said read only memory and random access memory being divided into an unpaged part and a plurality of paged parts, such that the address signals directly address said unpaged parts and page signals enable one of said paged parts to be addressed by said address signals;

a plurality of selectable page register means, each for storing a code, one of said page register means being selected at any time to provide said page signals as manifesting said stored code; and page register selection means responsive to said control signals and selected address signals defining said address space portions for selecting one of said page register means wherein said page register means includes first, second and third page register means, said first page register being selected to provide said page signals whenever a read data operation occurs with respect to said read only memory, said second page register being selected to provide said page signals whenever a read data operation occurs with respect to said random access memory, and said third page register being selected to provide said page signals whenever a write data operation occurs with respect to said random access memory.

2. The invention according to claim 1 wherein each of said page register means stores a code related to one type of data movement operation.

3. The invention according to claim 2 wherein said processor means includes means for changing the code stored by said page register means.

4. The invention according to claim 1 wherein said processor means includes means for changing the code stored by said page register means.

5. The invention according to claim 1 wherein said page register means include a first page register for being selected to provide said page signals whenever a data movement operation occurs with respect to said read only memory and further includes a second page register for being selected to provide said page signals whenever a data movement operation occurs with respect to said random access memory.

6. The invention according to claim 5 wherein said page register selection means responds to the address signals to select one of said first and second page registers.

7. The invention according to claim 1 wherein said page register selection means responds to said address signals and said control signals to select one of said first, second and third page registers.

8. A data addressing system for addressing data storage means comprising:
processor means which provides control signals and address signals, said control signals manifesting a data movement operation to be performed and said address signals defining addresses within a confined address space;
addressable memory means for being addressed within said confined addressable space, said memory means including both read only memory addressable in a first portion of said confined addressable space and random access memory addressable in a second portion of said confined addressable space, said read only memory and random access memory being divided into an unpaged part and a plurality of paged parts, such that the address signals directly address said unpaged parts and page signals enable one of said paged parts to be addressed by said address signals;
a plurality of selectable page register means, each for storing a code, one of said page register means being selected at any time to provide said page signals as manifesting said stored code; and
page register selection means responsive to said control signals and selected address signals defining said address space portions for selecting one of said page register means;
wherein said page register means includes a programmable multiword by multibit register file and logic means associated with said file for decoding signals applied thereto from said page register selection means and addressing one of said words of said file, said addressed word providing said page signals.

9. The invention according to claim 8 wherein said system further comprises a data bus coupled between said processor, said memory and said file, said processor means being capable of providing data signals to said data bus and for receiving data signals applied to said data bus; and
wherein said file further includes logic therein for responding to the data bus signals and a write page register signal provided by said processor means for altering the code in a selected word of said file in accordance with said data bus signals.

10. The invention according to claim 9 wherein said system further comprises gate means coupled between said page signals and said data bus and enabled by a read page register signal provided by said processor means, to provide said page signals to said data bus.

11. The invention according to claim 8 wherein said selection means includes a plurality of data inputs coupled to selected address signals, a plurality of selection inputs coupled to said control signals, and at least one output at which is provided a signal related to one of said signals applied to said data input, said one signal being selected in accordance with the state of said control signals applied to said selection inputs.

12. The invention according to claim 11 wherein said control signals coupled to said selection inputs of said selection means manifest whether a read or a write operation is to be performed and whether the manifested operation is to be performed with respect to said memory means or said page register means, said address signals coupled to said data inputs of said selection means being chosen to select one word of said file as indicated by said control signals.

13. A data addressing system for addressing data storage means comprising:
processor means which provides control signals and address signals, said control signals manifesting a data movement operation to be performed and said address signals defining addresses within a confined address space;
addressable memory means for being addressed within said confined addressable space, said memory means including both read only memory addressable in a first portion of said confined addressable space and random access memory addressable in a second portion of said confined addressable space, said read only memory and random access memory being divided into an unpaged part and a plurality of paged parts, such that the address signals directly address said unpaged parts and page signals enable one of said paged parts to be addressed by said address signals;
a plurality of selectable page register means, each for storing a code, one of said page register means being selected at any time to provide said page signals as manifesting said stored code; and
page register selection means responsive to said control signals and selected address signals defining said address space portions for selecting one of said page register means;
wherein said system further includes memory enabling means responsive to said address signals and said page signals for enabling one of at least a part of said unpaged read only memory, at least a part of said unpaged random access memory, at least a part of one page of said read only memory, and at least a part of at least one page of said random access memory.

* * * * *